United States Patent Office 3,427,352
Patented Feb. 11, 1969

3,427,352
PURIFICATION OF N-METHYL-2-CHLOROACETO-ACETAMIDE AND N,N-DIMETHYL-2-CHLORO-ACETOACETAMIDE
Jon B. Reid and David L. Pearson, Aurora, Colo., assignors to Shell Oil Company, New York, N.Y., a corporation of Delaware
No Drawing. Filed Nov. 30, 1966, Ser. No. 597,896
U.S. Cl. 260—561                                    6 Claims
Int. Cl. C07c 103/62, 17/00

ABSTRACT OF THE DISCLOSURE

Mixtures of 2,2-dichloro- and 2-monochloro-acetoacetamides are subjected to hydrolytic degradation in a weakly acid to weakly basic medium, i.e., pH 6–8.5, to selectively degrade the 2,2-dichloroacetoacetamide.

---

This invention relates to an improved process for the purification of N-methyl-2-chloroacetoacetamide and N,N-dimethyl-2-chloroacetoacetamide products containing the same together with N-methyl-2,2-dichloroacetoacetamide and N,N-dimethyl-2,2-dichloroacetoacetamide.

THE PRIOR ART

According to U.S. Patent No. 2,802,855, issued Aug. 13, 1957, to Whetstone and Stiles, alkenyl esters of phosphoric acid are effective insecticides. A particular one of these esters, i.e., dimethyl 1-methylcarbamyl-1-propen-2-yl phosphate, is now marketed commercially. The patent discloses that this insecticide can be prepared by the reaction of α-chloro-N-methylacetoacetamide with trimethyl phosphite.

The α-chloro-N-methylacetoacetamide or α-chloro-N,N-dimethyl-acetoacetamide precursors have customarily been prepared by chlorinating the corresponding N-methylacetoacetamide or N,N-dimethylacetoacetamide. Available methods for effecting these chlorinations, however, have left much to be desired, such methods resulting in the incomplete conversion of the amide, as well as in the production of substantial amounts of α,α-dichloroamides. When the crude product containing the dichloroamides is used in preparing the insecticide, the dichloroamides also react with trimethyl phosphite to form dimethyl-1-methylcarbamyl-2-chloro-1-propen-2-yl phosphate. This is highly undesirable, inasmuch as the monochloro derivative is much inferior to the unchlorinated phosphate derivative as an insecticide, and has a higher mammalian toxicity. This requires at least that the dichloroamide be removed from the crude chlorination product; this is, however, a very difficult operation, since the boiling points of the mono- and dichloroamides are close together, and other physical characteristics of the two are similar.

THE OBJECTS

It is, therefore, an object of the present invention to provide an improved process for the purification of N-methyl- and N,N-dimethyl-2-chloroacetoacetamide unduly contaminated with N-methyl- and N,N-dimethyl-2,2-dichloroacetoacetamide. More particularly, it is an object of the invention to provide an improved process for the selective hydrolytic degradation of the N-methyl-2,2-dichloroacetoacetamide and N,N-dimethyl-2-chloroacetoacetamide contaminants.

These and other objects, aspects and advantages of the invention will become apparent from the following description of the invention.

THE INVENTION

It has now been found that N-methyl-2-chloroacetoacetamide or N,N-dimethyl-2-chloroacetoacetamide, contaminated with N-methyl-2,2-dichloroacetoacetamide or N,N-dimethyl-2,2-dichloroacetoacetamide, can be purified by a selective hydrolytic degradation of the dichloroamide in a weakly acid to weakly basic medium, i.e., pH of about 6–8.5.

Henceforth throughout this specification the abbreviations MMAA, DMAA, MMCAA, DMCAA, MMDCAA and DMDCAA will be used to refer to N-methylacetoacetamide (monomethylacetoacetamide), N,N-dimethylacetoacetamide (dimethylacetoacetamide), N-methyl-2-chloroacetoacetamide (monomethylchloroacetoacetamide), N,N-dimethyl-2-chloro-acetoacetamide (dimethylchloroacetoacetamide), N-methyl-2,2-dichloroacetoacetamide (monomethyldichloro-acetoacetamide), N,N-dimethyl-2,2-dichloroacetoacetamide (dimethyldichloroacetoacetamide), respectively.

In general, the MMCAA/MMDCAA or DMCAA/DMDCAA mixture, which may be prepared by chlorination of the corresponding MMAA or DMAA, e.g., by using an alkyl hypochlorite (as disclosed in copending application of Pearson and Hutton, Ser. No. 597,872, filed Nov. 30, 1966 is present in an organic solvent, such as an alkanol or methylene chloride. Before proceeding with the hydrolytic degradation of the invention, however, it is preferred to strip the amide mixture to remove the solvent. The mixed amide solution, however, will still be acidic, due to the by-product hydrochloric acid formed as a result of the chlorination. This acid should be neutralized before the mixture is degraded, preferably with a relatively weak base, still more preferably with aqueous ammonia. After stripping and neutralization of the MMCAA/MMDCAA or DMCAA/DMDCAA mixture, it is ready for the hydrolytic degradation of the invention.

The degradation of the MMDCAA or DMDCAA is coupled with the formation of a light end impurity, as well as small quantities of heavy ends. The light end is an N-methyl- or N,N-dimethyl-dichloroacetamide (DCA), and the heavy end is an N-methyl- or N,N-dimethyl-3-amino-2-chlorocrotonamide, the enamine derived from MMCAA or DMCAA and ammonia. Since a mole of acetic acid is also formed during the hydrolytic cleavage of MMDCAA or DMDCAA, base must be provided to neutralize this acid and maintain a controlled pH of between about 6 to 8.5.

The chloroenamine does not represent a yield loss, since it may be converted back to MMCAA or DMCAA in acidic solution. Further, the dichloroacetamide acts only as an inert diluent, and does not react with the trimethyl phosphite in the subsequent toxification reaction with the monochloroamide. It can easily be removed from the finished insecticide product by stripping in a wiped film evaporator.

The effect of the concentration of mono- and dichloroamide in the feed stream on the relative degradation rates is minimal. However, while the invention may be utilized in separating and concentrating low monochloroamide-containing streams, its major application is found in separating and concentrating streams which contain small amounts of the dichloroamide as a contaminant in a predominantly monochloroamide-containing stream.

Care should be taken in the degradation reaction to provide proper mixing. High local base concentrations due to inadequate mixing can cause increased monochloroamide degradation. Any suitable mixing vessel known in the art equipped, e.g., with baffles and propeller-type stirring blades may be used, so long as strong local concentrations of base are avoided.

It is generally preferred to use a weak base for the degradation. By weak base is meant a base, which at about 0.1 molar concentration, has a $K_a$ value of no greater than about $5 \times 10^{-5}$. For example, suitable weak bases include sodium bicarbonate, sodium acetate and ammonium hydroxide buffered with ammonium chloride. Ammonia, due to its availability and low price, is the preferred base of the invention. The normality of the ammonium hydroxide employed preferably is such that a weakly basic to weakly acidic pH is obtained, and, of course, depends upon the concentration of the MMCAA/MMDCAA mixture and the amount of acetic and hydrochloric acid that must be neutralized. Concentrations of ammonium hydroxide ranging between concentrated commercial grade (i.e., about 28.6% ammonia) downwards to about 1% are satisfactory. Preferably, however, the base concentration is between about 1.5% and and 4% by weight ammonia. Other weak bases, such as those enumerated above, may be used, so long as they maintain the pH of the system between about 6 and 8.5.

The hydorlytic degradations can be carried out satisfactorily at temperatures between about 0° C. and 50° C., preferably between about 20° C. and 40° C. The degradation rates at the higher temperatures, however, are about two to three times faster than at the lower temperatures. Thus, the temperature, as well as the pH employed, will dictate the reaction time. It is generally preferred, however, to continue the degradation reaction for a time sufficient for at least about 75%, preferably at least about 85%, of the dichloroacetoacetamide to be degraded.

The molar ratio of base to dichloroacetoacetamide charged is at least 1:1, and preferably higher. The reaction proceeds more rapidly at higher hydroxide concentrations; however, as noted above, the reaction time may vary somewhat, depending on a number of parameters such as temperature, concentration of base (i.e., the pH of the system), and the ratio of base to the mixture charged. Generally, reaction times between about 15 and 180 minutes are adequate.

The particular pH employed in the reaction is very important, being a major factor in the relative speed of the reaction. In general, it is preferred to maintain a pH of between about 6 and 8.5, still more preferably between about 6.5 and 8.

A series of runs were performed on aqueous solutions containing about 4% by weight crystallized MMCAA/MMDCAA mixtures. These amide mixtures were subjected to hydrolytic degradation at about 20° C. by adding 2.6 N aqueous NH₄OH solution at a rate to maintain a predetermined pH. The amide concentrations used were dictated by the solubility of MMDCAA in water. The runs were sampled at 0.5, 5 and 10 minutes, and analyzed by gas-liquid chromatography. Due to much slower reaction, longer reaction times and higher pH's were used with MMCAA. The degradation rates obtained with MMCAA are compared with those from MMDCAA in Table I at various pH values.

TABLE I

| pH | Half-Life, Minutes | |
|---|---|---|
| | MMCAA | MMDCAA |
| 8.5 | 75 | |
| 8.0 | 110 | |
| 7.5 | 234 | 2.3 |
| 7.0 | 590 | 5.6 |
| 6.5 | | 11.1 |

In general, the MMDCAA degradation is about 100 times as fast as the MMCAA degradation over a pH range of about 6 to 8.5. The wide separation in the degradation rates of these compounds indicates that the MMDCAA can be almost completely degraded without degrading any appreciable portion of the MMCAA.

In a preferred embodiment of the invention, a degradation zone is charged with a monochloroacetoacetamide/dichloroacetoacetamide mixture obtained from the selective chlorination of MMAA or DMAA. Ammonium hydroxide is added to neutralize any by-product HCl which might remain in the mixture, and the solutions are thoroughly mixed by any suitable means while the pH is maintained at about 7 by the semi-continuous addition of ammonia. The temperature is raised to between about 15 and 40° C. during the ammonia addition, and is maintained in this range throughout the degradation. At the completion of the reaction, usually in between about 30 to 120 minutes, the mixture is acidified with a strong acid, such as HCl, to a pH of between about 1 and 4, preferably about 2, and the pure monochloroacetoacetamide is extracted with a selective solvent, such as methylene chloride. The extracted product is then ready for toxification by reaction with trimethyl phosphite, or for subsequent processing.

The following examples are illustrative of the present invention. All percentages are expressed as percent by weight.

The examples

The solution to be degraded were placed in open glass vessels immersed in a water bath. The bath was placed on a magnetic stirrer and pH electrodes were immersed in the solution. An automatic titrimeter was used to measure the pH of the solution and, subsequently, to titrate the solution with ammonium hydroxide to a preset pH value. As the pH slipped back on the acid side, the titrimeter added more base. After a predetermined time interval, the titration was manually stopped. The reaction mixture was then extracted with methylene chloride. The methylene chloride extracts were stripped in a rotary evaporator to terminal conditions of 75–80° C. at 1–2 mm. Hg for 30 minutes, and the residues analyzed by gas-liquid chromatography. The results from several runs are set out in Table II.

We claim as our invention:

1. An improved process for the purification of a 2-chloroacetoacetamide product of the formula

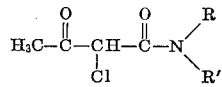

wherein R is methyl and R' is hydrogen or methyl, which product contains up to 25% by weight of the corresponding 2,2-dichloroacetoacetamide as contaminant, comprising intimately contacting said 2-chloroacetoacetamide product with a weak base which has $K_a$ value of no greater than about $5 \times 10^{-5}$ at a concentration of 0.1 molar, while maintaining a pH of between 6 and 8.5 and at a temperature of between about 0° and 50° C. for a time sufficient for said contaminant to be degraded to said 2-chloroacetoacetamide product.

2. A process in accordance with claim 1 wherein the weak base is ammonia.

3. A process in accordance with claim 1 wherein said temperature is between about 20° and 40° C.

4. A process in accordance with claim 1 wherein the time is between about 15 and 180 minutes.

5. A process in accordance with claim 1, further characterized in that the 2-chloroacetoacetamide product is acidified to a pH of between about 1 and 4, and, after acidification, is extracted with methylene chloride.

6. The process of claim 1 wherein the pH is about 7.

References Cited

C.A. 56, 7128h, Abstract of, Anliker et al., Helv. Chim. Acta 44, 1622–45 (1961), C.A. reference relied on.

ALEX MAZEL, *Primary Examiner.*

R. V. RUSH, *Assistant Examiner.*